(12) United States Patent
Monti

(10) Patent No.: US 7,681,720 B2
(45) Date of Patent: Mar. 23, 2010

(54) DEVICE FOR TRANSPORTING CONTAINERS

(75) Inventor: Giuseppe Monti, Pianoro (IT)

(73) Assignee: Marchesini Group S.p.A., Planoro (Bologna) (IT)

(*) Notice: Subject to any disclaimer, the term of this patent is extended or adjusted under 35 U.S.C. 154(b) by 0 days.

(21) Appl. No.: 12/110,405

(22) Filed: Apr. 28, 2008

(65) Prior Publication Data
US 2008/0271976 A1    Nov. 6, 2008

(30) Foreign Application Priority Data
May 3, 2007    (IT) .......................... BO2007A0317

(51) Int. Cl.
  *B65G 17/12*    (2006.01)
(52) U.S. Cl. .............. 198/867.01; 198/867.11; 198/867.14; 198/867.15; 198/465.2; 198/469.1
(58) Field of Classification Search .......... 198/800, 198/867.11, 838, 867.01, 867.14, 867.15, 198/465.1, 465.2, 479.1, 480.1, 469.1
See application file for complete search history.

(56) References Cited
U.S. PATENT DOCUMENTS

| | | | |
|---|---|---|---|
| 3,860,107 A * | 1/1975 | Cioni et al. | 198/867.14 |
| 3,952,860 A * | 4/1976 | Specht | 198/701 |
| 5,564,556 A * | 10/1996 | Spada et al. | 198/803.13 |
| 6,321,904 B1 * | 11/2001 | Mitchell | 198/867.11 |
| 6,325,198 B1 | 12/2001 | Pattantyus-Abraham et al. | |
| 6,439,376 B1 * | 8/2002 | Spatafora et al. | 198/803.14 |
| 7,131,532 B2 * | 11/2006 | Webster et al. | 198/867.15 |
| 2004/0144627 A1 * | 7/2004 | Trebbi et al. | 198/867.15 |

FOREIGN PATENT DOCUMENTS

DE    27 02 395 A1    8/1978

* cited by examiner

*Primary Examiner*—Mark A Deuble
(74) *Attorney, Agent, or Firm*—William J. Sapone; Coleman Sudol Sapone P.C.

(57) ABSTRACT

The device for transporting containers comprises a cogged belt which extends along a ring-wound trajectory and is wound on at least a pair of cogged wheels which are rotatable on vertical axes, and a plurality of regularly distanced support means borne on the external surface of the cogged belt, which receive respective containers. The cogged belt bears a plurality of skates constrained to the internal surface thereof which engage with guide means that are solidly restrained to a fixed structure of the device, in order to constitute a lateral constraint which prevents transversal movements and deformation of the cogged belt.

18 Claims, 6 Drawing Sheets

DEVICE FOR TRANSPORTING CONTAINERS

BACKGROUND OF THE INVENTION

This invention concerns a cogged belt device for in-line transport of containers, in particular, vials, rigid tubes and the like.

In-line transport systems for containers, in particular, vials and the like, are known at present which are destined for use in automatic machines for filling and packing such containers. Transport systems of this type substantially comprise a pair of vertical-axis cogged wheels on which a cogged belt is wound which can translate in a horizontal direction, drawn by the cogged wheels. The cogged belt conveys a plurality of containers housed inside respective support means which are constrained to the cogged belt at regularly distanced positions.

In particular, in a known technical solution, the support means exhibit a shaped portion which forms a horizontal support plane for the container, and a pair of appendages which laterally surround the container, thus retaining the container in a transport position. The shaped portions are constrained to the external side of the cogged belt by means of suitable screw means.

The screw means suitably engage with corresponding nut screws afforded in prism-shaped elements shaped according to a geometric profile of the cogs of the cogged belt and arranged in such a way as to replace some cogs. In effect, at the zones of application of the support means of the containers, the cogged belt exhibits on its internal side respective false cogs consisting of the elements which constrain the support means of the containers.

Transport systems of the type described are constructively and functionally simple, since they make it possible to obtain transport lines of diverse types and geometric conformation which easily adapt to different operational requirements.

However, a frequent criticism is that the weight of the containers housed in the support means along the belt may induce lateral torsional stress in the belt. This stress deforms the belt, which thus deviates from the vertical operating configuration for which it is designed. Deformation causes wear, alignment problems for the operating organs of the machine and further damage to the plant.

Obviously the effects of the drawback described may be more or less serious according to the thickness, width and flexibility of the belt, the weight and dimensions of the containers transported, and the distance between the cogged wheels.

SUMMARY OF THE INVENTION

The aim of this invention is to obviate the aforementioned drawback by providing a device for in-line transport of containers which makes it possible to avoid torsional deformation of the cogged belt.

A further aim of the invention is to provide a constructively and functionally uncomplicated transport device which is highly reliable in operation, versatile in use, and relatively inexpensive.

The abovementioned aims are achieved by means of a device for transporting containers of a type comprising a cogged belt which develops along a ring-wound trajectory and is wound about at least a pair of cogged wheels rotatable on vertical axes, and a plurality of regularly distanced support means borne on an external surface of the cogged belt, which support means receive containers to be transported, characterized in that fixed to an internal surface thereof the cogged belt exhibits a plurality of skates which engage with guide means integral to a fixed structure of the device, in such a way that at least one lateral constraint is provided to prevent transversal shifting and deformation of the cogged belt.

BRIEF DESCRIPTION OF THE DRAWINGS

The characteristics of the invention are outlined below, with particular reference to the appended tables of drawings, in which.

Figure 1:
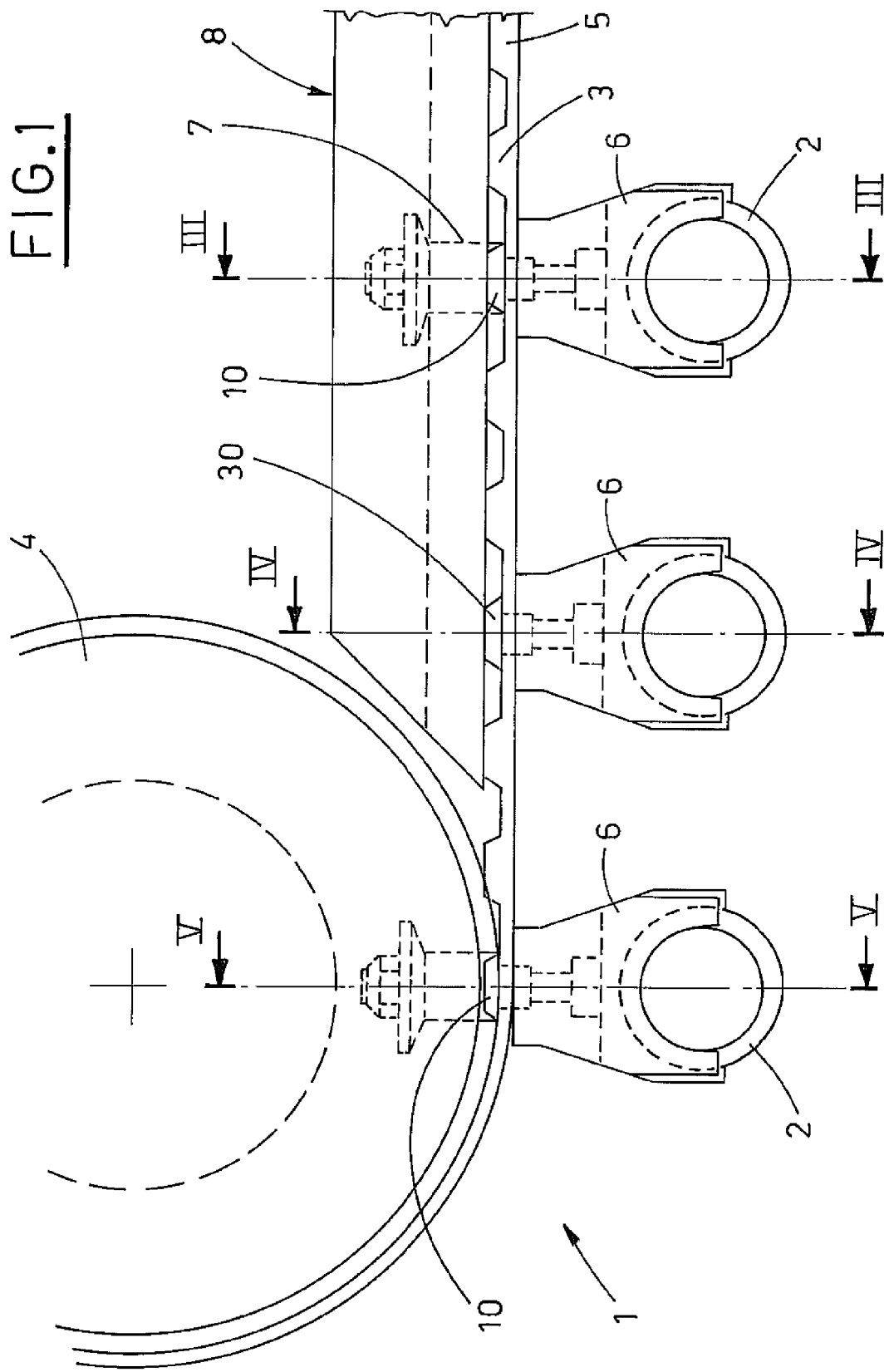
FIG. 1 shows a plan view of a portion of the transport device of the invention.

In the figures the reference number 1 refers to the device for in-line transport of containers 2 such as vials and the like, in its entirety.

DESCRIPTION OF THE PREFERRED EMBODIMENTS

The device 1 is installed on a fixed structure not illustrated in the appended drawings. The fixed structure rotatably supports at least a pair of cogged wheels 4, which lie in the same horizontal plane and are keyed to respective vertical shafts. The cogged wheels 4 are turned in a known way.

A cogged belt 5 wound on the cogged wheels 4 is provided on an internal surface thereof with a series of cogs 3 having a straight profile matching that of the cogs of the cogged wheels 4. The cogged belt 5 is translated in a horizontal plane, drawn by the cogged wheels 4.

A plurality of regularly distanced support means 6, which receive respective containers 2 to be transported, are constrained to the external surface of the cogged belt. In a known way, the support means 6 are constituted by a shaped portion which forms a horizontal support plane 6a for the container 2, and by a pair of appendages 6b which laterally surround the container and block it in the transport position.

Figure 4:
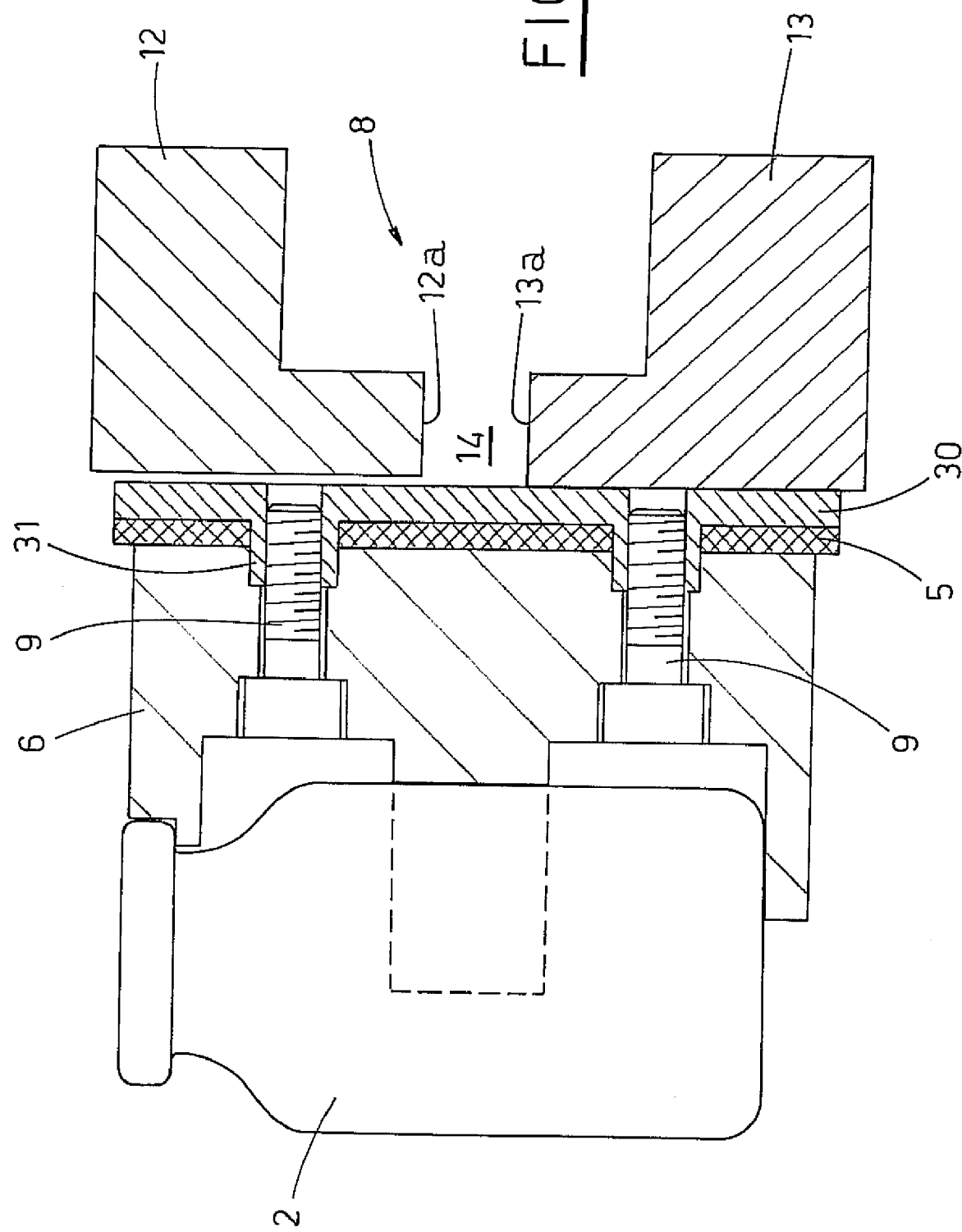
FIGS. 4 and 5 respectively show a vertical section view of the transport device along the planes IV-IV and V-V in FIG. 1.

The supports 6 are solidly constrained to the cogged belt 5 by screw means 9 which engage with corresponding nut screws 31 afforded in prism-shaped elements 30 shaped according to the geometric profile of the cogs 3 of the cogged belt 5 and arranged in place of respective cogs (see FIG. 4). The screw means 9 tighten the belt 5 between the supports 6 and the false cogs defined by the prism-shaped elements 30.

In the present invention, the cogged belt 5 bears a series of skates 7, applied on the internal surface thereof, which engage with guide means 8 which are solidly constrained to the fixed structure. The guide means 8 are arranged at least near the operational portion of the trajectory of the cogged belt 5 along which the containers Z are to be transported.

The guide means 8 are formed by a pair of prism-shaped members 12, 13, respectively upper and lower, between which a groove 14 is defined, which is parallel to the advancement direction of the cogged belt 5 and delimited by relative plane surfaces 12a, 13a facing each other (FIG. 4).

Figure 2:
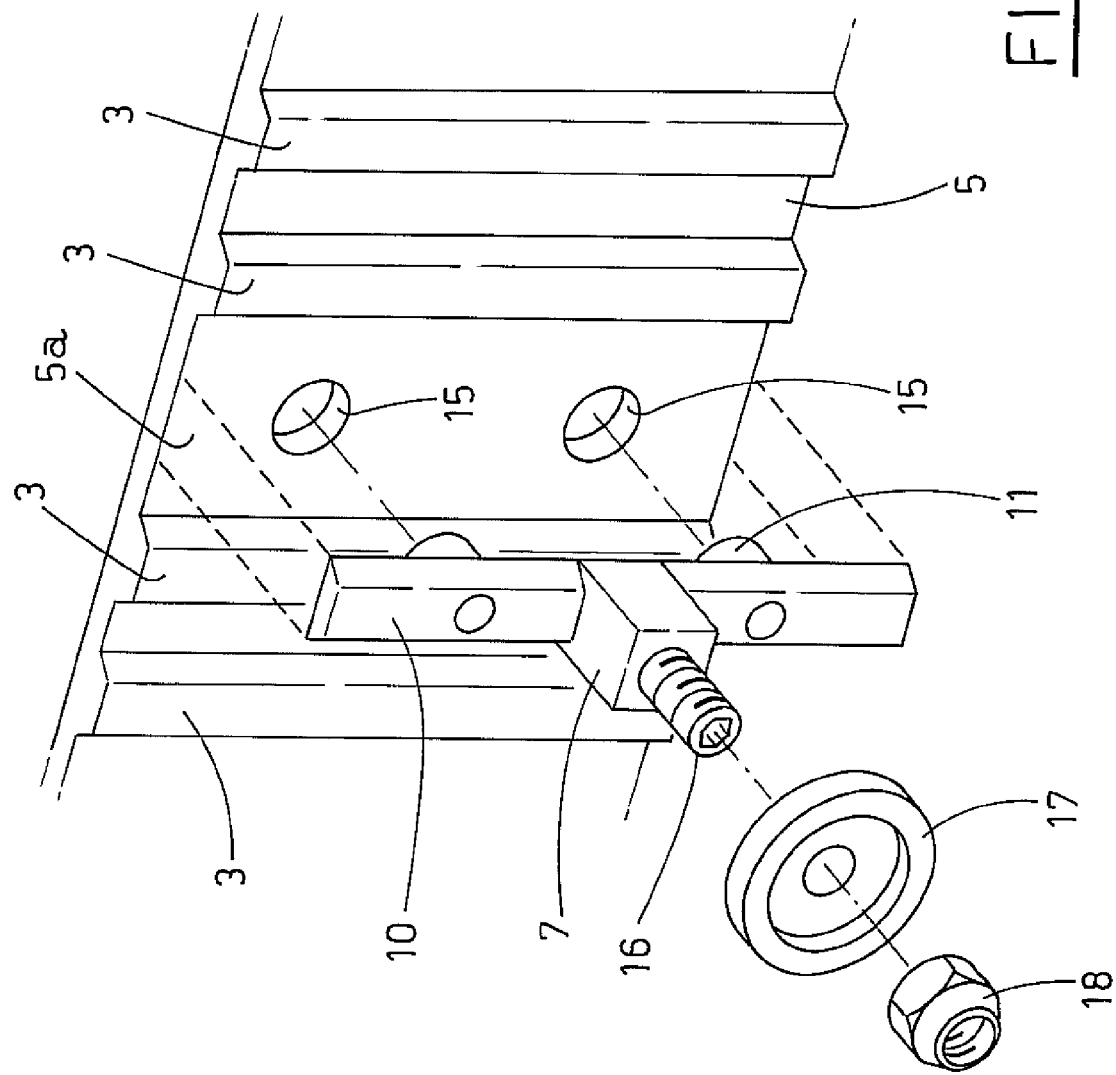
FIG. 2 shows an exploded axonometric view of a detail of the transport device.

The skates 7 are each constituted by a prism-shaped block, substantially a parallelepiped-shaped block, which extends from a prism-shaped element 10 shaped like the geometric profile of the cogs 3 of the cogged belt 5, similarly to the abovementioned false cogs 30 (FIG. 2). The skates 7 are destined to engage in the groove 14 of the guide means 8, as will be fully explained herein below.

Figure 3:
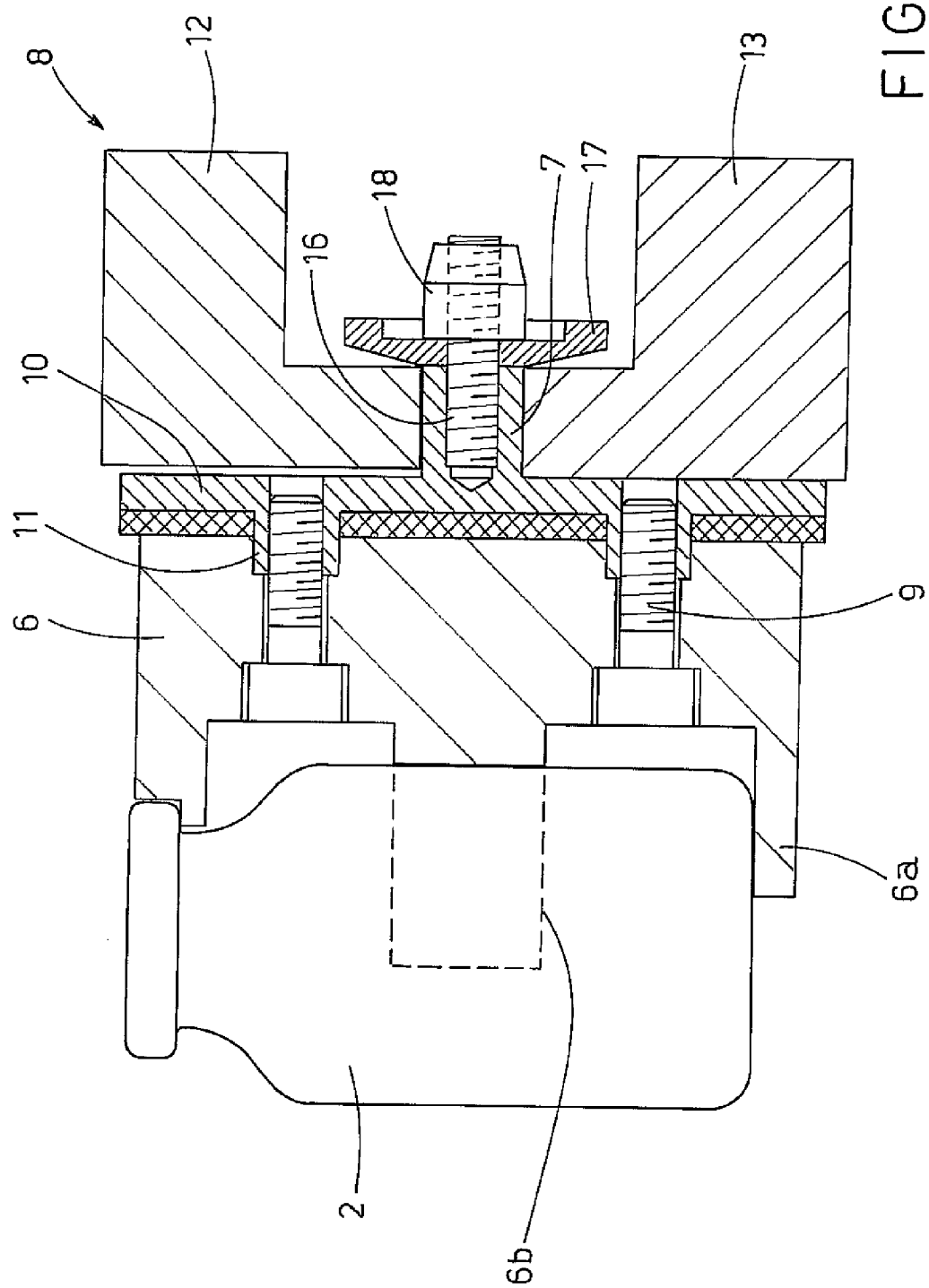
FIG. 3 shows a vertical section view of the transport device along the plane III-III, the section line of which is indicated in FIG. 1.

Similarly to the false cogs 30, the prism-shaped elements 10 of the skates 7 are solidly constrained to the cogged belt 5 by means of screw means 9 for fixing relative supports 6; the screw means 9 engage with corresponding nut screws 11 realized on the prism-shaped elements 10 (FIG. 3). The nut screws 11 fit into corresponding holes 15 afforded in the cogged belt 5 in sections 5a exhibiting a flat area in place of the cogs 3 (FIG. 2).

The skates 7 further exhibit a threaded blind hole for coupling with a screw 16 projecting from each of the skates 7. A circular washer 17 is inserted on the screw 16 and tightened against the relative skate 7 by means of a nut 18 (see FIGS. 2 and 3).

Figure 5:
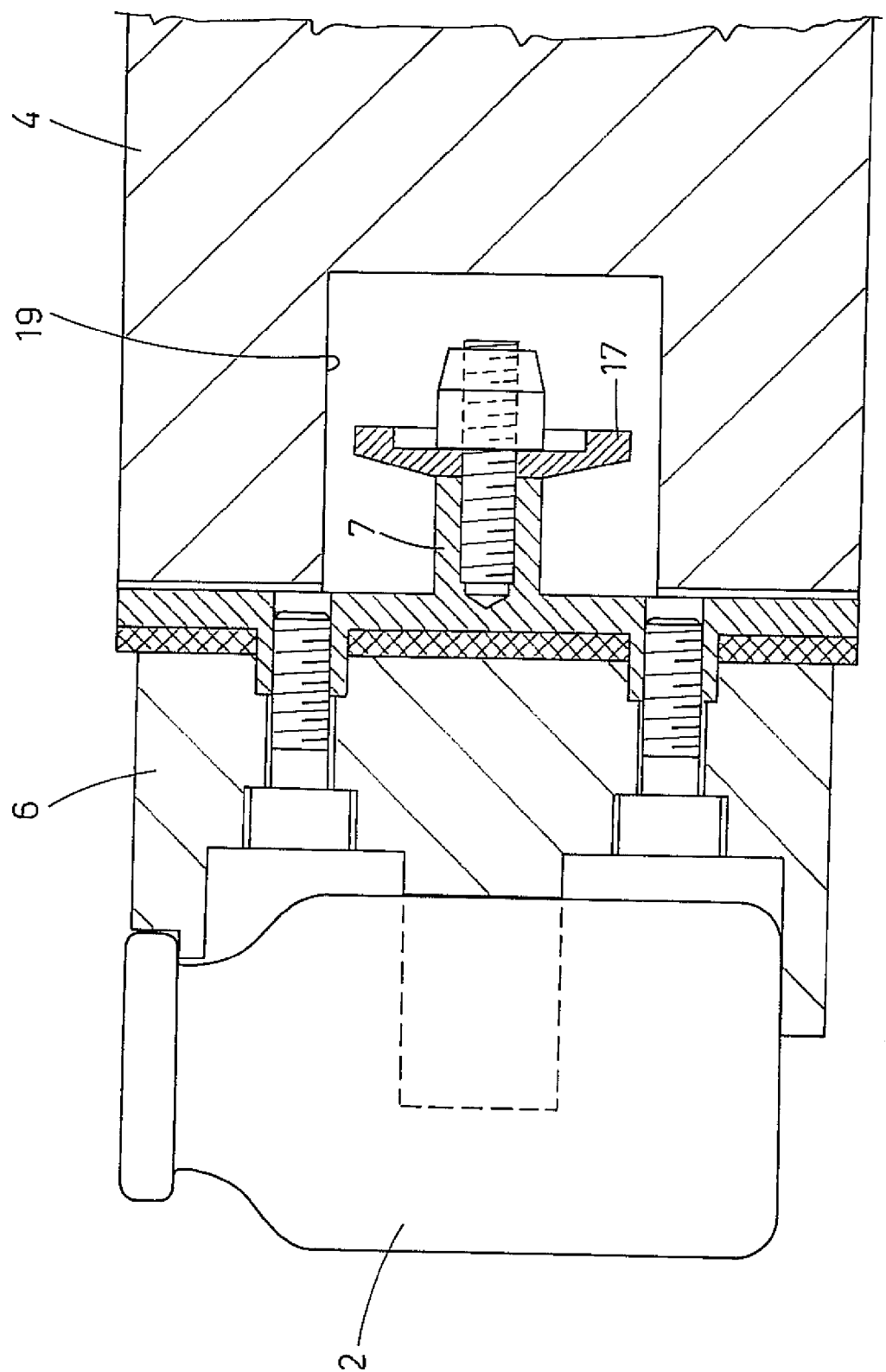

The cogged wheels 4 are of the cylindrical type with straight cogs, of a sufficient height to contain the width of the cogged belt 5. The wheels 4 exhibit an annular groove 19 afforded in the external surface thereof at a substantially median position of the height of the cogged wheels 4, which annular groove is of a sufficient size to contain the skates 7, which circulate fixed to the internal surface of the cogged belt 5 (FIG. 5).

The functioning of the described device for transporting containers is quite simple to comprehend.

In operating configuration, the skates 7 associated to the cogged belt 5 on the internal surface thereof engage slidingly with the groove 14 defined by the guide means 8 associated to the fixed structure. The washers 17, constrained respectively to the skates 7, ensure correct positioning of the skates 7, in particular preventing displacements thereof transversally of the guide means 8.

Thus the skates 7 constitute a lateral constraint for the cogged belt 5, which is therefore constantly maintained in a perfectly vertical position during operation. In this way, possible deformations of the cogged belt 5 are prevented, in particular when the containers 2 to be transported at the various operating stations of the machine are placed on the supports 6.

Note that when the skates 7 pass nearby the cogged wheels 4, the skates 7 are positioned inside the annular groove 19, thus avoiding interference.

Figure 7:
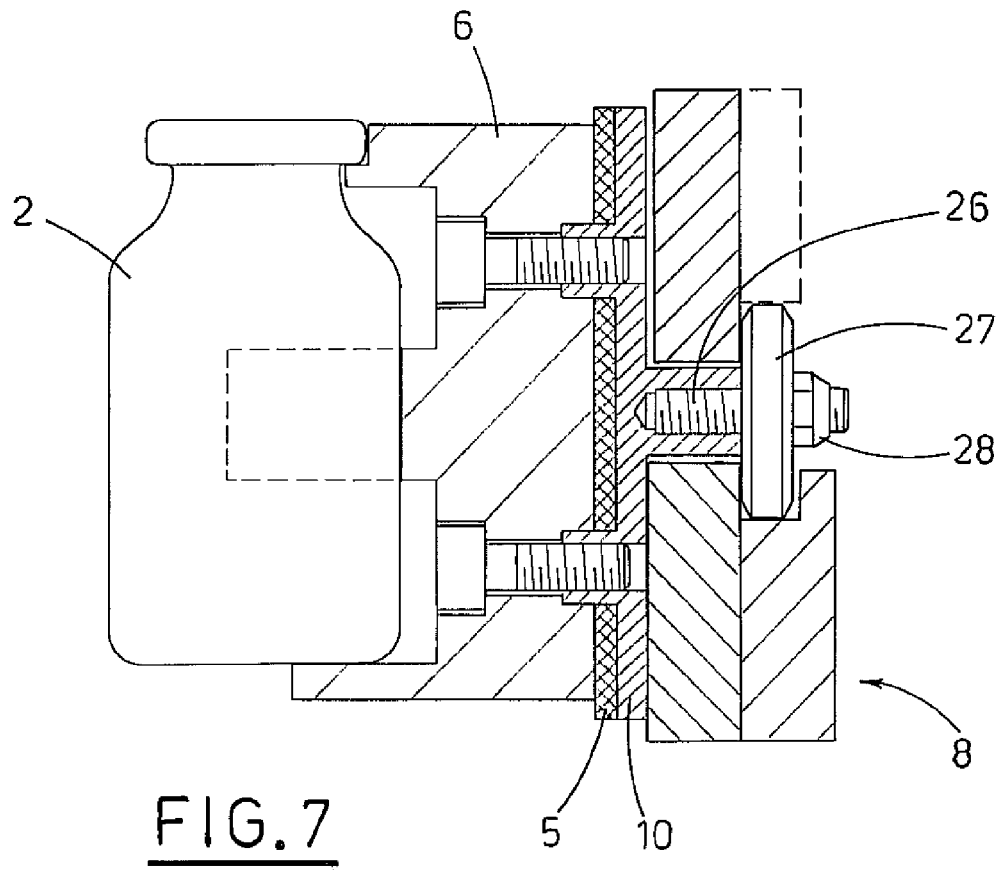
FIGS. 6 and 7 respectively show a plan view and a corresponding vertical section view of a different embodiment of the transport device of the invention.
Figure 6:
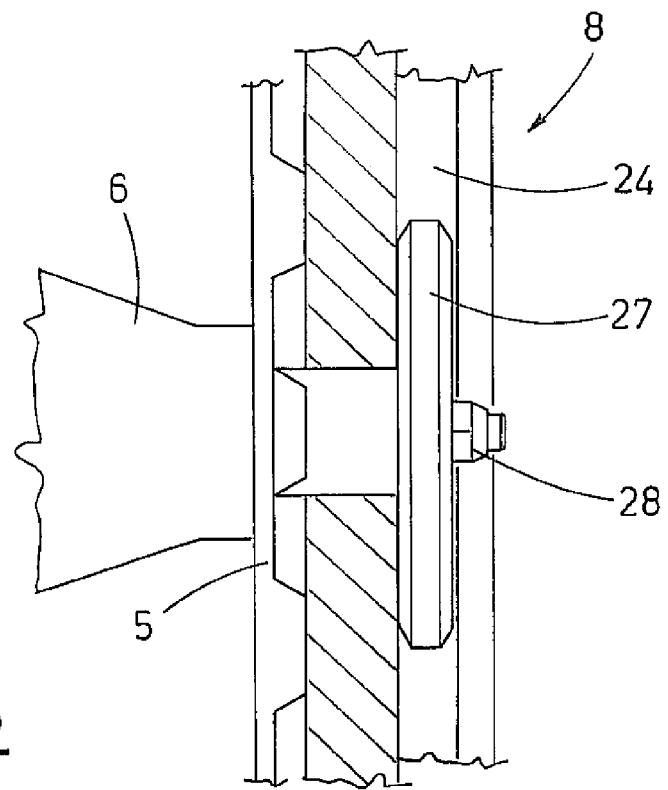

FIGS. 6 and 7 illustrate a different embodiment of the transport device in which the task of providing a lateral constraint for the cogged belt 5 in order to prevent possible deformation is performed by skates 27 borne projectingly by the prism-shaped elements 10 and fixed on the internal surface of the cogged belt 5 as described above; the skates 27 contribute to supporting the weight bearing down on the belt.

The skates 27 are constrained to screws 26 coupled to the prism-shaped elements 10 and are blocked by corresponding nuts 28. The skates 27 slide in a groove 24 afforded in the guide means 8.

The device of the invention for transporting containers achieves the aim of ensuring correct motion of the cogged belt, preventing deformation or shifting due to the torsional stress caused by the weight of the containers transported.

Note that this result is simply and effectively achieved by using skates 7, 27, which engage with a suitable groove 14, 24 defined by the guide means 8 which are provided near the sections of the trajectory of the cogged belt 5 involved in transport of the containers 2.

A distinctive feature of the transport device of the invention consists in the fact that the skates 7, 27 are solidly constrained to the cogged belt 5 in an opposite position to a part of the supports 6 of the containers 2. In particular, this fastening is obtained by means of false cogs 10 structurally similar to the false cogs 30 normally used to attach the supports 6 to the containers.

The cogged belt 5 has a series of flat areas 5a at predetermined intervals on the internal surface thereof, at which flat areas 5a the false cogs 10, 30 are applied. Supports 6 for the containers 2 are fixed to the false cogs 10, 30, a part of which supports 6 further support the skates 7, 27.

Of note is the fact that the transport device of the invention does not require modifications to the traditional bulk of machines and provides wide-ranging versatility in use in relation to the various operating requirements of automatic machines handling containers such as vials and the like.

The above description is intended as a non-limiting example, and any constructional variants should be considered as entering within the ambit of protection of the technical solution described above and in the following claims.

What is claimed:

1. A device for transporting containers comprising:
   a cogged belt which follows a ring-wound trajectory, the cogged belt being wound about at least one pair of cogged wheels rotatable on vertical axes, the device having a fixed structure for rotatably supporting said at least one pair of cogged wheels;
   a plurality of regularly distanced support means borne on an external surface of the cogged belt, the support means receiving containers to be transported; and,
   a plurality of skates fixed to an internal surface of the cogged belt which engage guide means integral to the fixed structure, each skate providing a lateral constraint to prevent transversal shifting and deformation of the cogged belt.

2. The device of claim 1 wherein the skates are constrained to the internal surface of the cogged belt at positions corresponding to positions of the support means borne on the external surface of the cogged belt.

3. The device of claim 2 wherein the skates are constrained to the support means by prism-shaped elements shaped according to a geometric profile of the cogs of the cogged belt.

4. The device of claim 3 further comprising screw means for fixing the prism-shaped elements and the support means to each other and to the cogged belt, disposed therebetween.

5. The device of claim 4 wherein the prism-shaped elements have nut screws which fit in corresponding holes provided in the cogged belt at sections of the cogged belt which exhibit a flat area in place of cogs, the screw means engaged to the nut screws for fixing the support means thereto.

6. The device of claim 1 wherein the cogged wheels contain an annular groove in an external surface thereof in a substantially position for alignment with the groove of the guide means, the annular groove being of a sufficient size to receive the skates which pass therethrough as the skates circulate fixed to the internal surface of the cogged belt.

7. A device for transporting containers comprising:
   a cogged belt which follows a ring-wound trajectory, the cogged belt being wound about at least one pair of cogged wheels rotatable on vertical axes, the device having a fixed structure for rotatably supporting said at least one pair of cogged wheels;
   a plurality of regularly distanced support means borne on an external surface of the cogged belt, the support means receiving containers to be transported; and,
   a plurality of skates fixed to an internal surface of the cogged belt which engage guide means integral to the fixed structure, providing at least one lateral constraint to prevent transversal shifting and deformation of the cogged belt, each skate constituted by a prism shaped block which extends from a prism shaped element shaped to provide a geometric profile of a cog of the cogged belt.

8. The device of claim 7 wherein the skates are constrained to the internal surface of the cogged belt at positions corresponding to positions of the support means borne on the external surface of the cogged belt.

9. The device of claim 7 wherein the skates are constrained to the support means by the prism-shaped elements.

10. The device of claim 9 further comprising screw means for fixing the prism-shaped elements and the support means to each other and to the cogged belt, disposed therebetween.

11. The device of claim 10 wherein the prism-shaped elements have nut screws which fit in corresponding holes provided in the cogged belt at sections of the cogged belt which exhibit a flat area in place of cogs, the screw means engaged to the nut screws for fixing the support means thereto.

12. The device of claim 7 wherein the cogged wheels contain an annular groove in an external surface thereof in alignment with the groove of the guide means, the annular groove being of a sufficient size to receive the skates which pass therethrough without interfering with the cogged wheels as the skates circulate fixed to the internal surface of the cogged belt.

13. A device for transporting containers comprising:
a cogged belt which follows a ring-wound trajectory, the cogged belt being wound about at least one pair of cogged wheels rotatable on vertical axes, the device having a fixed structure for rotatably supporting said at least one pair of cogged wheels;
a plurality of regularly distanced support means borne on an external surface of the cogged belt, the support means receiving containers to be transported; and,
a plurality of skates fixed to an internal surface of the cogged belt which extend transversally to the cogged belt and engage guide means integral to the fixed structure, providing at least one lateral constraint provided to prevent transversal shifting and deformation of the cogged belt, each skate constituted by a prism shaped block which extends from a prism shaped element shaped to match a geometric profile of a cog of the cogged belt;
wherein the guide means comprise a pair of prism-shaped members between which a groove is defined which is parallel to a direction of advancement of the cogged belt, the groove delimited by reciprocally-facing flat surfaces of the prism-shaped members, each skate which extends transversally to the cogged belt engaging slidingly with the groove of the guide means, wherein each prism-shaped block has a threaded blind-hole, a screw for coupling with the threaded blind-hole having a portion projecting into the groove, a circular washer coupled to the projecting portion of the screw, the circular washer acting on a side of the guide means to prevent transversal shifting of the skates.

14. The device of claim 13 wherein the skates are constrained to the internal surface of the cogged belt at positions corresponding to positions of the support means borne on the external surface of the cogged belt.

15. The device of claim 14 wherein the skates are constrained to the support means by the prism-shaped elements.

16. The device of claim 15 further comprising screw means for fixing the prism-shaped elements and the support means to each other and to the cogged belt, disposed therebetween.

17. The device of claim 16 wherein the prism-shaped elements have nut screws which fit in corresponding holes provided in the cogged belt at sections of the cogged belt which exhibit a flat area in place of cogs, the screw means engaged to the nut screws for fixing the support means thereto.

18. The device of claim 13 wherein the cogged wheels contain an annular groove in an external surface thereof in alignment with the groove of the guide means, the annular groove being of a sufficient size to receive the skates which pass therethrough without interfering with the cogged wheels as the skates circulate fixed to the internal surface of the cogged belt.

* * * * *